Patented Aug. 8, 1950

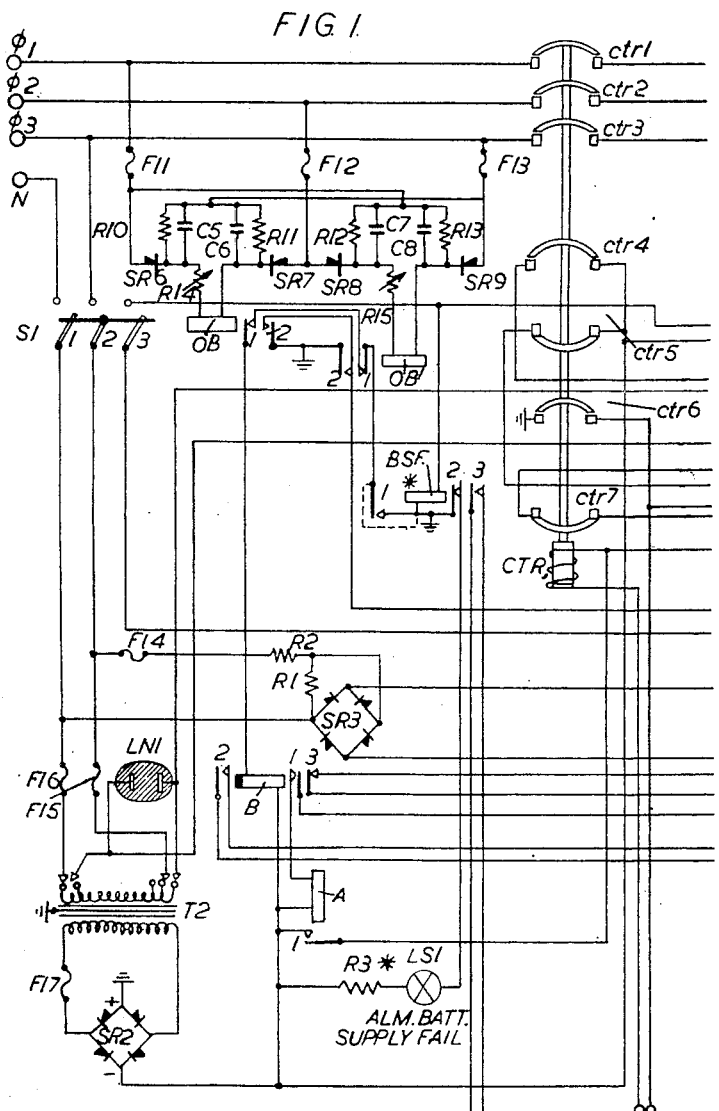

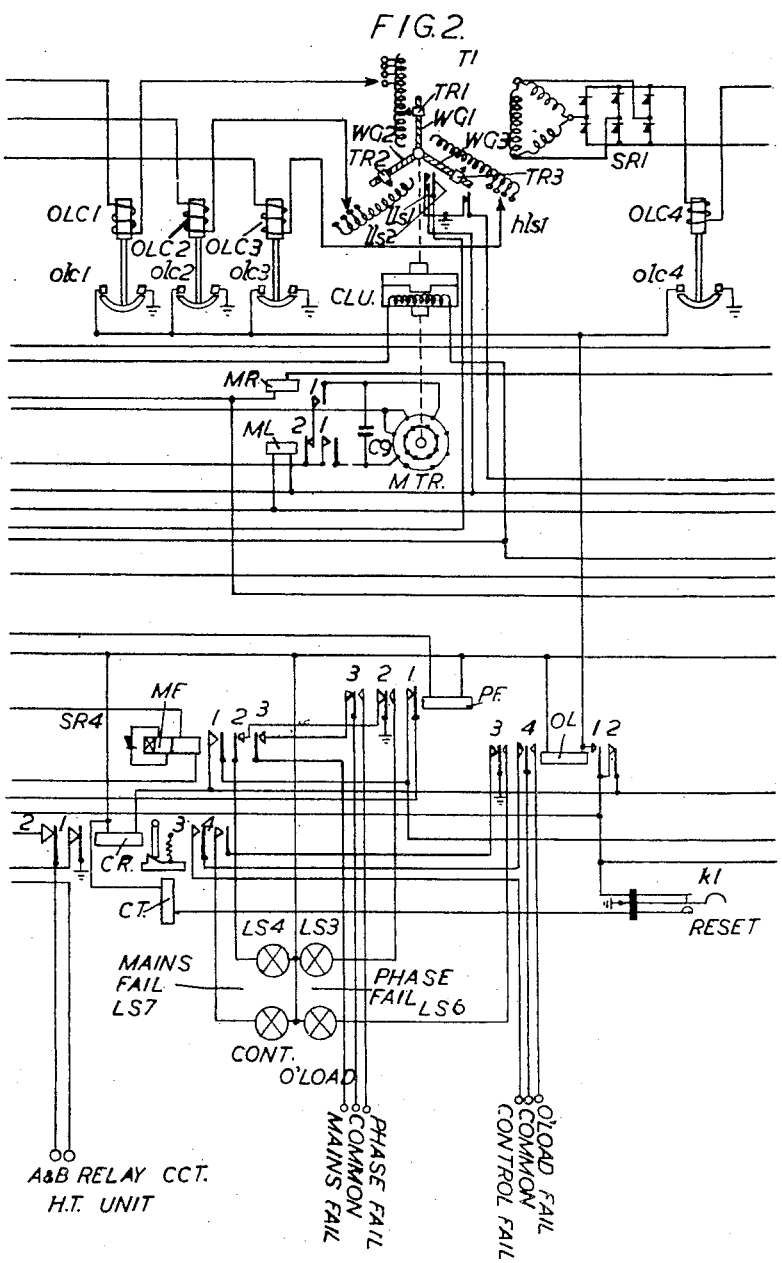

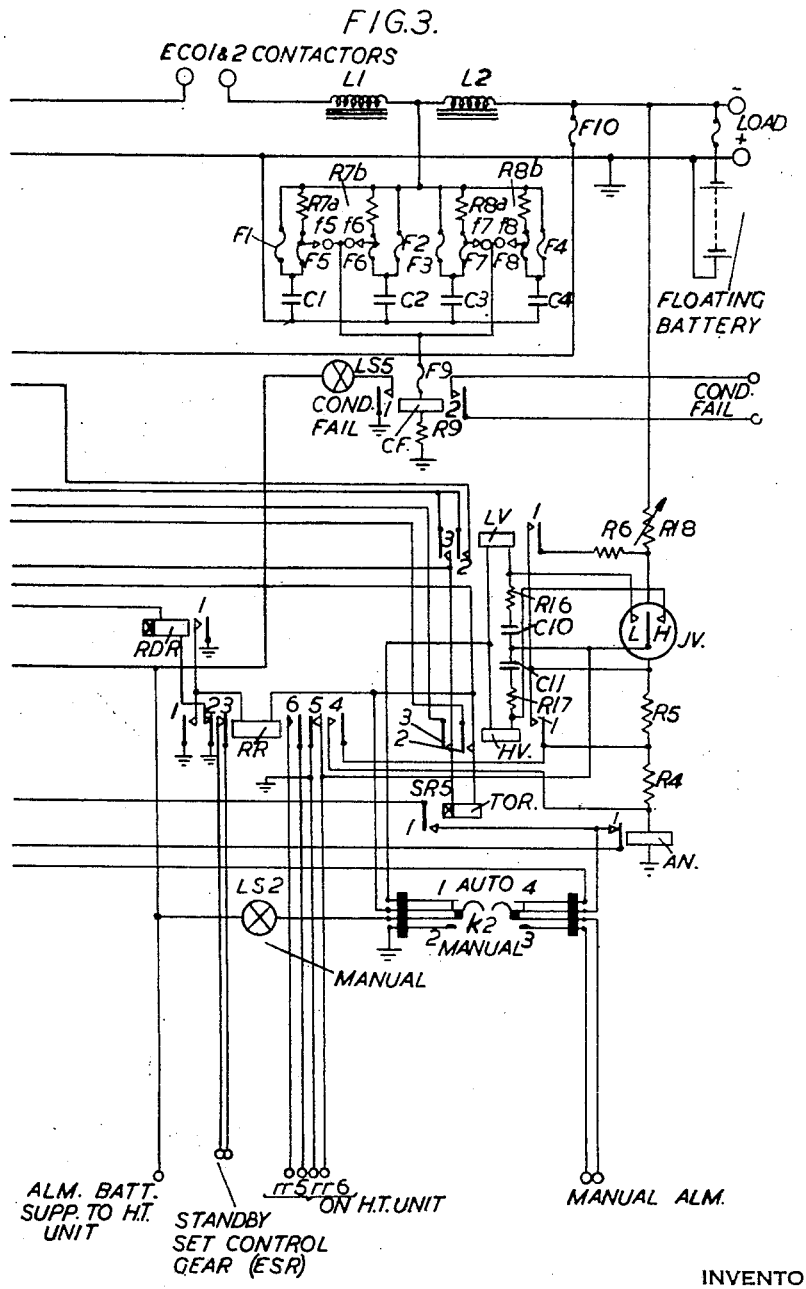

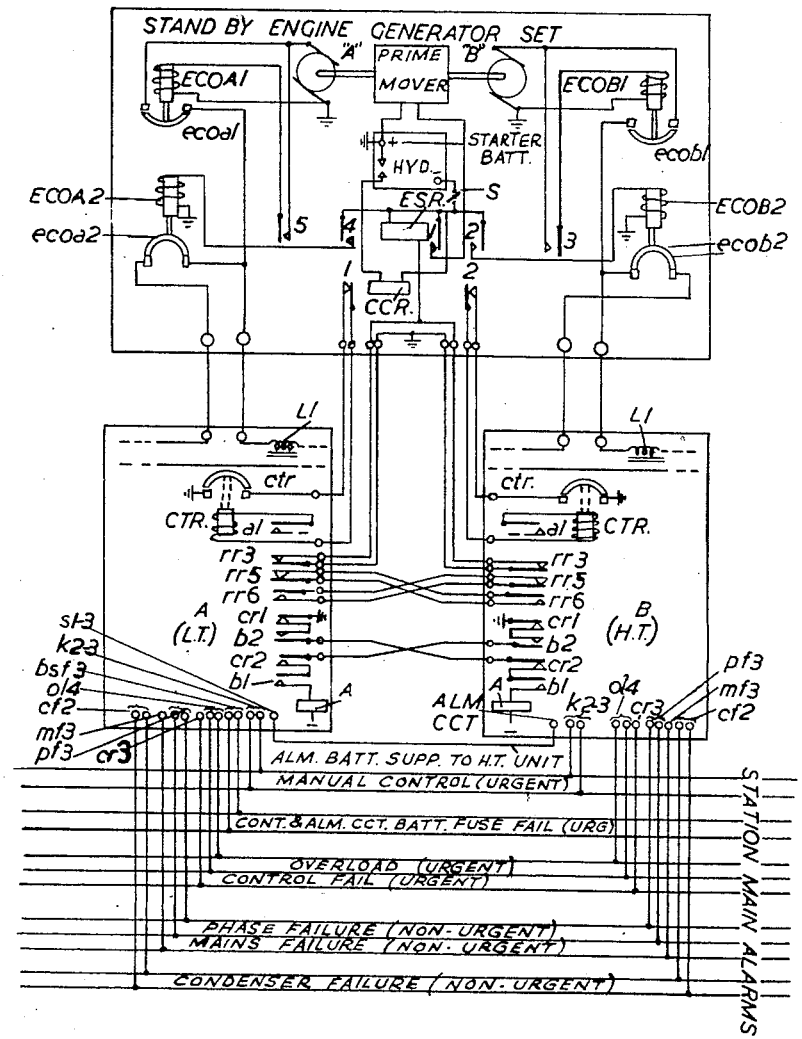

2,517,575

UNITED STATES PATENT OFFICE 2,517,575

ELECTRIC POWER SUPPLY SYSTEM

Richard Kelly, London, England, assignor to International Standard Electric Corporation, New York, N. Y., a corporation of Delaware Application January 14, 1948, Serial No. 2,194
In Great Britain January 15, 1947

2 Claims. (Cl. 171—97)

This invention relates to electric power supply systems employing stand-by or emergency supplies.

In such systems, the stand-by supply is generally arranged to be connected automatically in place of the normal supply, immediately, or as soon as practicable, upon failure of the main supply and restoration to normal subsequently, upon restoration of the main supply, may be automatically or manually controlled.

The present application has to do with automatically restored systems, although a certain amount of manual control may be incorporated under certain conditions, and the object of the invention is to control the restoration in such a way that it is effected as smoothly as possible and without causing a momentary overload either of the load by the power source, or of the power source by the load.

According to the invention, there is provided an electric power supply system comprising normal and stand-by power supply equipments adapted by means of automatic change-over equipment to be connected, one or the other to common bus-bars for maintaining substantially continuous supply of electric power to a load, characterized in this that means are provided in the automatic change over equipment for delaying the completion of an impending change over from one supply equipment to the other for a period of time sufficient to allow the output voltage of the said other equipment to be brought to a predetermined value by manual or automatic regulating means associated therewith.

In supply equipment of this type it is common to arrange for the normal supply to comprise a voltage-regulated rectifier unit connected to the A. C. mains and supplying the load with unidirectional current, a secondary battery of moderate proportions floating across the load circuit bus-bars being provided to give additional smoothing and to carry the load for short periods in emergency.

For the stand-by supply, it is common to provide a prime-mover driving a generator adapted to supply either the A. C. load or the D. C. load. From the point of view of safeguarding continuity or supply to the load it is preferable to provide a D. C. generator so that as much as possible of the normal A. C. supply equipment is eliminated in the stand-by condition, the stand-by power being connected direct to the bus-bars, or at any rate via the smoothing equipment.

Upon failure of the main supply, or of the associated equipment liable to lead to an interruption of the supply to the load, automatically operating mechanism is adapted to cause the stand-by engine-generator to start up and to take over the load as soon as the voltage of the generator is normal, the load in the interval between the failure of the normal unit and the commencement of full operation by the stand-by unit being carried by the floating battery.

Subsequent operation of the stand-by unit must be directed not only to supplying the normal load but also to recharging the floating battery and its own starter battery, and these operations must be completed satisfactorily before restoration to mains operation can be permitted. This state of affairs may be indicated by the condition of certain relay contacts in the automatic controlling equipment which, when in the condition indicating "batteries charged," allow restoration to proceed.

When the normal supply unit is voltage-controlled, as stated above, the range of variation provided to cater for varying loads may be such as to render the voltage output from the rectifier units to be very different from that required by the load on restoration, thereby either endangering the load by a temporary over-voltage or discharging the battery by a temporary under-voltage. In either case the voltage conditions are soon rectified by the automatic voltage regulating gear, but in the latter case, the rectifier unit has to provide an additional load to recharge the battery, and this may be sufficient to trip certain overload release relays, thereby preventing indefinitely a restoration to normal conditions.

The problem has thus been stated in terms of a somewhat narrowly defined supply system, but, in general, a similar problem will exist in any dual supply system of this kind, and means are disclosed herein for dealing with it.

Moreover, the arrangements described may be applied equally to any number of parallel supply systems supplying different parts of the same equipment with (not necessarily) different voltages, e. g. high tension, low tension, alarm battery voltages, and it is convenient in such a case for a single prime mover to drive all the necessary stand-by generators, so that a failure in one or more of the normal supply units must initiate a change-over of all of them to stand-by generators. Some amount of interlocking between the controlling mechanisms of the various units must therefore be envisaged, to effect instantaneous change over and controlled restoration (or change back).

The invention will now be particularly described with reference to the accompanying drawing illustrating a preferred embodiment incorporating a system of the type just described and comprising two interlocked rectifier cubicles for supplying regulated and smoothed high tension and low tension direct current to, for example, telephonic repeaters in a repeater station, with facilities for automatic change-over to stand-by generating equipment. Such a system forms the subject of our pending U. S. application No. 793,740, filed December 24, 1947, now abandoned.

In the drawing, Figs. 1-3 when placed side by side from left to right show a complete rectifier cubicle arrangement operating from three-phase A. C. mains supply adapted to supply regulated and smoothed direct current to a load, and comprising starting, controlling, and change-over circuits for connection to stand-by direct current supply;

Fig. 4 shows, partly in block form and partly in detail, two cubicles A and B of the type shown in Figs. 1-3 with their inter-connections, together with connections to a stand-by engine generator set providing alternative sources of direct current for the loads normally served by the two cubicles. The connections indicated in the generator set portion of Fig. 4 form no part of the invention but comprise a working circuit which is necessary for the understanding of the invention. A and B are assumed in this embodiment to provide L. T. and H. T. current respectively.

In considering the operation of the units of this equipment from the point of view of their controlling mechanisms, it is desirable to concentrate attention not so much on the "starting-up" aspect which is a relatively simple process of starting one or other of the supply systems, and adding the load a little at a time and is a comparatively rare process in the life of an installation like a telephonic repeater station, but rather from the point of view of changeover from one condition of supply to the other.

It will be convenient first to refer to Fig. 4 in order to obtain an overall picture of the set-up of a power supply system of the type envisaged which includes two rectifier units for providing separate supplies from A. C. mains, of low tension (L. T.) and high tension (H. T.) voltage particularly for use in telephonic repeater stations, and in which provision is made for automatic change-over to a stand-by engine generator set in case of mains failure. Provision is also made for automatic control of the load circuit voltage when in the mains operated condition, and alternatively for manual control thereof, if desired, but these features are not exemplified in Fig. 4 which, as indicated in the description of Fig. 4 given above, is included primarily to show the interconnection between the separate operative units involved.

In the figure are shown two rectifier supply units A and B, for LT and HT respectively, and a commonly held stand-by engine generator set comprising a prime mover, preferably an internal combustion-engine, two D. C. generators coupled therewith for providing stand-by D. C. supplies, a starter battery for the prime-mover and various relays and contactors in a controlling circuit. The controlling circuit shown is not intended to be exhaustive or complete, but to illustrate the principle involved, and, as stated, forms no part of the invention.

The back contacts $rr3$ shown in each rectifier unit and connected in parallel are adapted to close when either unit fails for any reason, as will be described herein in the appropriate place, and in so doing to connect ground to the engine start relay ESR in the stand-by set, battery being supplied to this relay from the starter battery via the switch S, closed for use. ESR operates and at:

(a) Contact 1 connects the battery to the starter motor of the prime mover;

(b) Contacts 2 and 4 completes the magnet circuits of the engine change-over contactors ECOA2 and ECOB2 in order to disconnect the respective load circuits from the dead rectifiers;

(c) Contacts 3 and 5 prepares operating circuits for the engine change-over contactors ECOA1 and ECOB1 for connecting through the D. C. generators to the load when they are up to speed.

The loads, meantime, are carried by floating batteries (not shown) permanently connected across the load circuit terminals.

When the generators are up to speed, in the space of about 15 seconds, the voltage generated is sufficient to operate the contactors ECOA1 and ECOB1 over the prepared circuits, and the loads are now taken by the respective generators which in addition supply sufficient power for recharging the floating batteries and the starter battery. The arrangements for effecting the re-charging of the starter battery are not shown explicity, nor are any trickle-charging arrangements for keeping the battery fully charge at all times, but such arrangements are well-known in the art. Contacts HYD, however, shown in the starter battery block, are intended to represent hydrometer or the like operated contacts adapted to open when the battery is fully charged for purposes such as controlling the charging current, delaying change-back and the like.

As shown, the contacts are adapted to close the circuit of a relay CCR having two back contacts which control the contactor-operating circuits of mains contactors CTR in the A and B units respectively. These contactors connect the A. C. mains to the main rectifiers, among other functions, and it will be seen that this process would be delayed in the event of a speedy restoration of the mains after failure and change-over to stand-by supplies until the starter battery was fully re-charged. (Note: It would be undesirable to have to run the prime mover on light load for the sole purpose of charging the starter battery because the A. C. mains happened to have been restored after a short failure; stand-by conditions are therefore maintained until this process is complete.)

The measures adopted for delaying change-back on these grounds could apply equally to the recharging of the floating batteries, to avoid overloading of the main rectifiers and possible tripping of series overload contactors, as herein described. However, with some modest degree of overload capacity provided in the rectifiers, and with the restore delay feature also incorporated and to be described herein, coupled with the fact that recharging commences immediately change-over to stand-by is completed, there is little chance of danger likely to arise from this contingency, and similar hydrometer contacts have not been shown for these batteries.

The slight difference in the procedures for change-over to stand-by and change-back to mains may be emphasized here. In change-over, operation of ESR immediately operates the ECO2 contactors but only prepares the circuits of the ECO1 contactors for operation in due course. In change-back, however, release of ESR reverses both pairs of contactors simultaneously so that the alternative D. C. supplies for each load will not be connected in parallel, and the D. C. generators die down eventually with the stopping of the prime-mover.

The remainder of the arrangements shown in Fig. 4 are to do with interlocking features between the A and B units to be described in full herein, and with the connections of the units to common station alarms shown here as a busbar arrangement common to several sets of equipment.

Referring now to Figs. 1-3, in each unit or cubicle of this equipment, a three phase alternating current supply indicated at $\phi 1$, $\phi 2$, $\phi 3$ (Fig. 1), is adapted to be fed via contacts $ctr1$, 2 and 3 on a contactor CTR, and overload release relay winding OLC1, OLC2 and OLC3 respectively (Fig. 2), to a star-delta transformer T1 provided with a motor-controlled voltage tapping arrangement on each of its three primary windings. This will be described in more detail hereafter. The secondary (delta) output is fed to a three-phase metal rectifier bridge SR1 (Fig. 2), the output of which is taken via an overload relay winding OLC4 (Fig. 2) and again generator change-over contacts $ecoa1$ and 2 (or $ecob1$ and 2) (see Fig. 4) for an emergency D. C. supply, to a full-section smoothing filter $L_1L_2C_1-C_4$ (Fig. 3), thence to a battery of accumulators which float across the supply to give added voltage stability, and so to the load terminals for connection to a load. A marginal voltmeter relay JV connected in a circuit across the D. C. bus-bars in Fig. 3 normally controls via its relief relays HV and LV (Fig. 3) and their associated motor lower (ML) and motor raise (MR) relays (see Fig. 2) the motor MTR (Fig. 2) which operates via the magnetic clutch CLu the tap-changing mechanism on the input transformer T1 referred to above. This mechanism is indicated diagrammatically by a star-network of worm gears WG1, 2 and 3, and tapping riders thereon, TR1, 2 and 3 respectively. TR3 is adapted to actuate mechanically at the extreme ends of its travel the limit contacts $hls$ (high limit switch) and $lls$ (low limit switch), the functions of which will appear in due course.

A condenser failure relay CF common to all the condensers in the aforementioned smoothing filter (Fig. 3) gives visual and audible alarm if a condenser breaks down, in a manner to be subsequently described.

The remainder of the equipment provided has to do with (a) Contactor-closing (starting) mechanism;
(b) Contactor change-over mechanism, to standby equipment;
(c) Voltage control on the input transformer;
(d) Mains and (separately) phase failure indication;
(e) Overload release;
(f) Control circuit failure;
(g) Various alarm circuits;
(h) Manual control of A. C. input voltage.

Of these functions (a), (b) and (c) derive their operating power mainly from the A. C. supply, while (d), (e), (f) and (g) derive their power mainly from the battery itself, since they must function in the complete absence or loss of A. C. input power. Function (b) is a mixed arrangement of cut-out circuits designed to enable the voltage controlling gear to be operated manually, by a hand-wheel, or remotely, by push-button, while isolating automatic alarms and cut-outs proper to a control failure condition.

The contactor-closing and control circuit for each cubicle separately is energized from one of the phases ($\phi 3$) and neutral by means of a switch S1 which connects at S1—1 and S1—2 (Fig. 1) the phase and neutral to be tapped primary of the control-circuit input transformer T2 and a mains failure relay MF (Fig. 2) (via a small bridge rectifier SR3). The relay is provided with a low resistance second winding closed through a single rectifier SR4 connected in a specific direction so that the relay is made slow to operate, quick to release. The resistors R1 and R2 are provided to adjust the sensitivity of this relay.

Also tapped in to the primary of T2 are a raise-lower motor (MTR) circuit (Fig. 2) and neon indicator lamp LN1 (Fig. 1).

The fuses F15 and F16 in Fig. 1 serve to isolate completely the regulating and control circuits from the main supply circuit, so that a fuse failure in a part of the regulating and control circuits as distinct from the main circuit disables the whole of it, as described in the said prior patent application.

Before proceeding further from T2, reference must be made to the phase-failure relay arrangement tapped across the three phases via the fuses F11, F12 and F13 (Fig. 1) and its function vis-a-vis the mains failure relay which is in phase $\phi 3$ alone.

The object of the above mentioned mains failure relay MF is (a) to give warning of the presumed complete failure of the three-phase mains supply as indicated by the complete failure of one of its phases (i. e. $\phi 3$); and (b) to set in train operations to shut down the rectifier equipment and to effect change-over to stand-by supply equipment. This is dealt with in more detail at a later stage.

The phase-failure relay arrangement shown serves to give indication of failure or deviation of voltage on one or more phases, and again, to effect operation (b) just referred to, above. The arrangement used herein is the three-phase two-relay arrangement since for the purposes of this equipment, indication of any deviation at all on any of the phases, outside a certain minimum deviation, without indication of a particular phase, is a necessary and sufficient condition to effect change-over.

The two operative relays in this arrangement are OB and OB', which are normally unoperated, while the mains failure relay is normally energized.

The secondary winding of T2 feeds via a fuse F17 a full-wave bridge rectifier SR2 (Fig. 1) supplying D. C. power to the controlling circuit, and the immediate effect of the extension of power to this circuit is threefold. From the rectifier $-ve$ terminal, power goes to (a) a circuit for the magnetic clutch CLU returning to rectifier $+ve$ terminal ground via contacts $ctr7$ and low limit switch $lls1$; (b) the motor lower relay ML via $ctr5$ and returning to $+ve$ via $lls1$ aforesaid; and (c) the quick-make, slow release relay B (Fig. 1), completing its circuit via breaking-contacts $ob1$ of relay OB, and making contacts $bsf1$ actuated by the normally-energized battery supply fail relay BSF, shown in Fig. 1.

Relay ML (Fig. 2) operating over the above circuit and independently of any control by JV or its relief relays connects directly the regulating motor "lower" winding at front contacts $ml1$ to the control circuit A. C. supply, and the motor being thereby energized commences to run the tap-changing mechanism of T1 down to its lowest point in preparation for a subsequent re-adjustment from this point to an average tapping for the load in use before the extension of the circuit to the load. Relay B actuating before relay MF disables at b3 a control-failure-relay circuit adapted to be responsive to certain failure conditions and prepares a circuit at b1 for the operation of its own A relay (Fig. 1) and a similar circuit at b2 for the operation of the corresponding A relay on the other supply unit (B) (see Fig. 4). This other unit behaves similarly, and when both B relays have operated, both A relays operate, unless there is a fault condition giving rise to the operation of one or other of the control-fail relays CR (q. v.). The interconnections described are clearly shown in Fig. 4.

The A relay at its single contact a1 prepares the contactor (CTR) circuit for operation and energizes via rectifier SR5, ctr7 and lls1 time delay relay (TDR) (Fig. 3) adapted to operate and shut down the equipment if the contactor fails to operate within a certain time. SR5 (Fig. 3) prevents operation of TDR under certain conditions by oppositely-directed "sneak" currents which may be present.

When the low-limit-switch comprising the change-over contacts lls1 and lls2 on the controlling gear is reached, it is mechanically operated, thereby releasing the motor-lower relay ML and the clutch CLU at lls1 and operating the mains contactor CTR to ground via contacts lls2 and contactor control relay (CCR) contacts 1 or 2, as the case may be, in the stand-by generator set controlling gear (Fig. 4) CCR is controlled by the state of charge of the starter battery in that gear, and it will be assumed that the relay is normal, and, as before, an absence of over-riding fault conditions in the control-failure circuits of both units.

The mains contactor operating, (a) Locks up over its own contact ctr6;

(b) Extends the three-phase supply to the mains transformer T1 at ctr1, 2 and 3;

(c) Releases at ctr7 the clutch and the time delay relay TDR, which will not normally by then have completed its operation;

(d) Breaks down the automatically-operating circuit of the motor-lower relay at ctr5, preparing, by the closing of contact ctr4, the circuit of the motor-raise relay MR; and (e) Energizes the restore delay relay RDR (Fig. 3) also by the closing of contact ctr4, the circuit being completed at rr2, a control on restore relay RR, shown in Fig. 3, and not yet operated.

Relay RDR is properly associated with change-back from standby operation and controls relay RR as a relief relay; for the moment, it is sufficient to note that it introduces a delay in the restoring of A. C. mains operation to the load, and that the change-over operations of contacts ecoa1 and 2 (ecob1 and 2) from standby operation are delayed until operation of this relay RDR.

By virtue of the so-far unoperated front contact rr4 in the JV relay circuit (Fig. 3), JV is given a distinct bias to "low" on account of the extra series resistance R4 introduced into the JV circuit, and LV relay (Fig. 3) is therefore actuated, by a circuit from SR2 −ve over a1, K2—1, JV1—L, rr5 to +ve (ground). Contact K2—1 is part of the Manual-auto key K2.

Operation of LV relay thereupon operates motor raise relay MR at lv2, over the previously prepared circuit, and re-energizes the clutch and time delay relay (TDR) over lv3, and the motor therefore commences now to step up the tappings on T1 and continues to do so for a pre-determined time, long enough to restore the tappings to a point where the voltage output from the main rectifier SR1 is about average for the normal (and generally reasonably constant) load.

This time interval will be accurately known, since the motor is stepping up the voltage from a known value—the lowest attainable.

This time interval is also made the delay period of RDR, so that, when RDR eventually operates, T1 is giving approximately its normal output.

Operation of RDR causes the operation of restore relay RR (Fig. 3) by ground over rdr1, and the following operations take place:

(a) Relay RR locks up over its own contact rr1;

(b) Relay RDR is released at rr2;

(c) Resistor R4 (Fig. 3) is short-circuited at rr4, removing the "low" bias on JV;

(d) LV and HV relay circuit (Fig. 3) is open-circuited at rr5, but will be closed again when relay RR of the other unit operates, closing rr6, as shown more clearly by Fig. 4;

(e) Contact rr6, operating in the LV and HV circuit of the other unit closes that circuit if or when it is opened by its own rr5 contact;

(f) Contact rr3 in parallel with a similar contact from the RR relay of the other unit (see Fig. 4) and operating in the stand-by equipment auto-control gear, will so control this gear as to effect change-back at ecoa1 and 2 (and ecob1 and 2) when both contacts rr3, are opened on the two units, as explained in connection with Fig. 4. Thus, when both units are in condition to supply their respective loads from A. C. mains—and this implies (a) Absence of all fault conditions on both; (b) Mains units adjusted to give approximately normal outputs for their respective loads; then the mains units take over the load with the merest disturbance of the load voltage conditions, and the circuit continues to function under the regulating influence of JV relay, acting through its relief relays HV and LV and their associated circuits in well-known manner.

The reason for this somewhat elaborate procedure is to ensure that there is no initial violent discharge of the floating battery—which is generally only of moderate proportions—at the moment of change-over as might occur if the rectifier output voltage was then unduly low, and had to be stepped up in its due time by the regulating circuit. The subsequent recharging load added to the normal load might well cause the overload contactor to trip falsely, and so prevent the load ever getting back on to the mains. This was referred to in connection with Fig. 4.

From this point on (i. e. the point of satisfactory change-back to mains), the automatic regulator takes full control in each unit, under the control of the marginal relay JV, as follows:

(i) JV goes to "low"

LV operates over a1, K2—1, JV1—L, and rr6 of the other cubicle, and (a) desensitises JV at lv1 by shunting R6 across it, thereby preventing contact chatter at JV1—L; (b) operates MR over ctr4, lv2 and hls1; (c) operates the clutch and TDR over lv3 and hls1 TDR, in addition via a1; and MR operates the motor on its raise winding at mr1.

Control should be effected and LV released before TDR has time to operate.

(ii) JV goes to "high"

HV operates over $a1$, $K2$—$1$, $JV1$—$H$ and $rr6$ of the other cubicle and (a) increases the current in JV by short-circuiting R5 at $hv1$, thereby preventing contact chatter at $JV1$—$H$; (b) Operates ML over $a1$, $hv2$, and $lls1$; (c) Operates the clutch and TDR over $hv3$ and $lls1$, TDR in addition, via $a1$; and ML operates the motor on its lower winding at $m11$, disabling the motor raise circuit at $ml2$ as a precaution against the eventuality of both relays MR and ML being operated simultaneously by a fault and causing the motor to be damaged.

As before, control should be effected and HV released before TDR has time to operate.

In either case, control by the motor to the limit at either extreme of regulation causes the operation of the appropriate limit switch, $lls1$ and $2$, or $hls1$, this action opening the motor controlling and clutch circuits and suspending further control until more normal conditions are restored. An emergency or alarm condition is not signalled.

Each operation of the clutch under normal controlling conditions is accompanied by energization of the time delay relay which does not normally, however, have time to operate before control is effected. If, however, the motor fails to operate for some reason, e. g. burnout, seizure or the like, and control is not effected, the controlling circuit is not released, and the time delay relay eventually operates.

EMERGENCY OR ALARM CONDITIONS

Other principal features of this invention reside in the facilities provided for dealing with various alarm conditions, and these will now be described in some detail.

The alarm circuits generally for each cubicle are comprised in an overall alarm circuit of which there is one for each cubicle, both being energized from the bus-bars of one of the supplies, in this case, the low tension or A supply (Fig. 4). Interconnections of the several alarm circuits into the various station alarm circuits are also indicated in Fig. 4.

Power from the negative bus-bar is taken via fuse FLO (Fig. 3) and switch contact $S1$—$3$ (Fig. 1) to both alarm circuits in parallel, a lead for the B unit being shown in Fig. 3. Only one such circuit need be considered in detail, its various features being described hereunder.

The alarms are of two types, "Urgent" and "Non-urgent," and the "Urgent" type will be discussed first.

I. URGENT ALARMS

(a) Control failure

Control failure, i. e. failure of the controlling gear to effect satisfactory control of the output voltage, may result from a number of causes, some of which have been discussed already. With the single exception already referred to (over-control by the motor), control failure signals an appropriate alarm condition, closes down both rectifier units and changes over to stand-by supplies.

From whatever the cause resulting in a condition of control failure, a control failure relay CR (Fig. 2) is operated from the low voltage D. C. supply over one of a plurality of circuits. This is a "latching" or mechanical locking relay which, once operated, locks itself up mechanically, and is only released by energization of the auxiliary winding CT by the operation of a non-locking reset key, $K1$ (Fig. 2).

Operation of the relay CR, (a) Interrupts the A relay circuit on each unit at $cr2$ and $cr1$ respectively, thereby tripping the respective contactors;

(b) Signals an urgent alarm at $cr3$ via $ol4$ (Fig. 2 and Fig. 4); and (c) Lights an appropriate lamp LS7 at $cr4$ via $ol3$, (normal).

In regard to (a) above, release of the A relays not only trips the respective contactors (CTR) but also interrupts the LV and HV relay circuits, prevents further operations of TDR and most important, releases RR. Release of RR immediately sets in operation at back contacts $rr3$ the engine-generator automatic controlling gear, as explained in connection with Fig. 4.

Conditions giving rise to control failure and requiring the signalling of an urgent alarm are:

(i) Control circuit fuse failure in the supply to T2, (F15 or F16, Fig. 1) or from T@ to the rectifier (F17). These fuses are inserted in the leads beyond the mains failure relay so that a mains failure is not signalled, but the contactor is tripped by failure of current and control suspended. The release of the B relay also occasioned thereby effects at $b3$ the operation of CR relay via mains failure contact $mf1$ MF is still operated, phase failure contact $pf1$ (normal), and reset key $K1$, normal and a control failure alarm is therefore signalled.

(ii) Failure of the marginal relay circuit resulting in an open-circuit releases a normally energized relay AN (Fig. 3). The single contact $an1$ of this relay closes, and completes the circuit for CR via the mains failure relay contact $mf1$ (operated), $K2$—$4$ (normal) and $K1$, giving control failure alarm and suspension of operation of both units. Key K2 will be referred to under "Manual Control."

(iii) Operation of the time delay relay TDR, previously referred to, operates directly the CR relay over its single contact $tdr1$, $K2$—$4$ and $K1$, giving control failure.

(iv) Operation of overload relay.

As indicated at the commencement of this description, four overload contactors, OLC $1$–$4$ are provided, three of the contactors being effective in the three phases of the main A. C. input, and one in the main D. C. output (Fig. 2). The contacts of these contactors are connected in parallel for operation of a relief relay.

Any one or more of the overload contactors subject to overload will cause the respective contacts $olc1$, $olc4$ to close to ground thus closing to battery via $s1$—$3$ the circuit of an overload relief relay OL having four contact sets, one of which ($ol1$) locks up the overload relief relay over $K1$ (normal); a second ($ol2$) operates the CR latching relay over $K1$ (normal) to suspend control and shut down the units; the third and fourth are change-over contacts to enable overload alarms to be signalled instead of control failure alarms, $ol3$ causing alarm lamp LS6 to glow instead of LS7 and $ol4$ changing over the station alarm from "Control Fail" to "Overload" (Figs. 2 and 4).

(v) Release of the battery supply fail relay (BSF, Fig. 1) due, for example, to the blowing of fuse FLO or a bus-bar failure, will open the B relay circuit at $bsf1$ (Fig. 1) and so initiate control fail conditions.

Contact $bsf2$, falling back and making, causes lamp LS1 to glow (Fig. 1) by control-circuit operating power, which has not, presumably, failed as has the bus-bar power energising the general alarm circuit.

Contact $bsf3$ initiates an urgent station alarm on falling back. N. B.—Relay BSF is equipped on one unit only—that supplying the battery for the alarm circuit (A in this case)—so that in the other unit, the wires for contacts $bst1$ are permanently strapped.

(b) Manual control

It will be realised that for some of the control failure conditions there is nothing inherently at fault in the main power supply circuit, but both supply units are closed down as a result of the control circuit failure, since this is the safest procedure to adopt until the cause of the failure can be ascertained. When this has been done, it would, in many cases, be found possible to continue operation of the main supply circuit without automatic voltage control, or with manual control, if facilities for so doing had been provided. Such circumstances would comprise, for example, failure of relay AN in the JV circuit, and eventual operation of the time delay relay TDR.

Hitherto, however, the complexities of the controlling circuit provided have prevented the introduction of a simple manual control key, isolating vital parts of the controlling circuit, and allowing the mains contactor to be operated, and it is believed that simple satisfactory means for doing this have not so far been achieved.

The equipment described in connection with the present invention has so far simplified matters, however, that by its use it is possible to isolate the controlling circuit with an auto-manual key, K2 having a minimum of two contacts only, K2—1 isolating the marginal-relay relief-relay circuit, and one contact K2—4 isolating certain aspects of the CR operating circuit. Two further contacts are, in fact, provided purely for alarm purposes, one K2—2, giving a local visual alarm on the equipment, and one, K2—3, an urgent station alarm.

This being done, it is a relatively straight-forward matter to introduce manual control and this may take either or both of two forms, (i) Local, by the use of a hand-wheel on the tap-changing mechanism, whereby the voltage can be adjusted to be within limits as indicated by a bus-bar voltmeter or other convenient means; the hand-wheel might, for example, be concealed and out of action under normal conditions, and brought into operative relationship with mechanism for manual control conditions;

(ii) Remote, by the use of push-button controlling keys on the unit itself or at a central control desk, enabling the motor (if still functioning) to be driven under manual control.

The addition of such facilities does not greatly increase the complexity of the switching required, and adds materially to the utility of the mains units.

With the arrangements provided, it is possible to go over to manual control of the mains units at any time when they are supplying their respective loads, merely by throwing the auto-manual key K2 in the respective units (either or both equally). Automatic control is thereby suspended and the load circuit voltage follows the variations of mains voltage and load circuit requirements, or of such manual control as may be effected.

(c) Manual operation of units under control fail conditions

Under conditions of control failure, from whatever cause, the contactor CTR is released following release of relay A at operated contacts $cr1$ and $cr2$ on the respective units; relay B is not necessarily released, but the units will have changed over to stand by supplies following release of RR.

For manual control, K2 is thrown, and K1 flicked to release CR, thereby reoperating A, and it may be assumed that the failure conditions are such that CR will not be immediately operated again on release of K1, i. e. that manual control under the conditions stated is possible.

With K2 thrown, the normal cycle of operations change back to mains operation as described above and culminating in the operation of CTR does not take place, and the first step, therefore, in assuming manual control is to run the regulator down to its lowest point manually so that contacts $lls2$ are closed, when CTR will operate, locking over $ctr6$ as before and energising RDR. When manual operation is contemplated as a natural corollary to control failure, as in this case, the assumption of manual control must take place from change-over conditions and not from rest, and hence the regulator must now be run up manually to a normal position before RDR operates, as previously described for automatic operation, and finally changing the units back to mains operation under manual control of the voltage.

II. NON-URGENT ALARMS

Three further emergencies are provided for which do not, however, initiate control failure conditions. Two of these are associated with mains failure, one being true mains failure, as indicated by complete (or nearly complete) failure on one selected phase, and the other being phase failure, indicating a specific voltage unbalance between any two or more of the three phases; and the third has to do with condenser failure (breakdown) in the filter unit. Mains (or phase) failure resulting, as it does, in simple change-over to stand-by operation, is in no sense a condition requiring urgent attention, and may not, in fact, be capable of urgent attention if the mains supply has truly failed from some enternal cause.

(a) Mains failure

As indicated earlier, the mains failure relay MF is a slow-make quick-release relay, operated by rectified A. C. from the one of the three phases energising the controlling circuits, and remains operated under normal conditions.

Failure (i. e. release) of the mains failure relay takes place instantly on failure of this one phase, and is followed by the instantaneous tripping of the mains contactor due to failure of holding current, and, in due course, by the release of the B relay.

The release of the mains failure and B relays in this order ensures that the latching relay CR is not operated, thereby setting up a control failure condition, and that only mains failure is indicated by the alarms.

Mains failure will be indicated visually on the equipment at lamp LS4 by ground over $pf2$ and $mf3$ (Fig. 2) and as a non-urgent station alarm over $pf3$ and $mf2$ (Figs. 2 and 4).

(b) Phase failure

The phase failure (or out-of-balance) relay arrangement (Fig. 1) is sensitive to a specific unbalance of potential between any two of the three phases and the particular type proposed for this equipment forms the subject of a separate patent specification No. 37,271/46.

On an unbalance being detected, one or both of the phase out-of-balance relays OB and OB' operate(s) and immediately open(s) the circuits of the PF (Fig. 2) and B relays, the former at ob2 and/or ob'2 as the case may be. The latter relay (B) ultimately releases, but is too late to set up control failure conditions at b"3, the CR circuit being by then open at pf1. Two further contacts on the phase failure relay effect change-over in the alarm-signalling conditions, thereby enabling phase failure alarm instead of mains failure alarm to be signalled. Contact pf2 (Fig. 2) controls the phase failure lamp, LS3, and pf3 (Fig. 2) controls the non-urgent station alarm (Fig. 4).

Phase failure alarm may, of course, be accompanied by mains failure, but the latter is ineffective, and only phase failure is signalled.

*(c) Condenser failure*

As indicated at the commencement of this description, an alarm circuit is provided for failure of the condensers in the filter sections provided for smoothing the main rectifier outputs.

This consists of a fuse failure alarm circuit, as provided in ordinary telephone exchange practice, a main fuse and a relief fuse being provided for each condenser used, and a common fuse-alarm relay for the bank of condensers on the one unit. Short-circuit of a condenser blows its series-connected fuse, thereby isolating the condenser from the filter circuit, and the blowing of the relief fuse which follows actuates the alarm.

Referring to Fig. 3, each condenser, e. g. C1, is connected into the filter circuits via a main, heavy-duty fuse, F1 in this case, shunted by a light relief fuse of alarm type, F5, adapted to make contact between its upper terminal and an alarm contact f5 when the fuse blows. The current through R1a F5 (top) and f5 flows via a common fuse alarm circuit fuse F9 to relay CF and through R9 to ground.

Thus, when any of the condensers break(s) down, the main fuse (F1, F2, F3 and/or F4) blows, followed immediately by its relief fuse (F5, F6, F7 and/or F8), relay CF operates and at contact cf1 gives visual alarm on lamp LS5 and non-urgent station alarm over cf2 (see Fig. 4).

The interlocking features described herein for two cubicles (supply units) would be extensible to groups of more than two units, at the expense of a certain amount of added complexity.

What is claimed is:
1. An electric power supply system comprising normal and stand-by power supply equipments adapted by means of automatic change-over equipment to be connected, one or the other, to common bus-bars for maintaining substantially continuous supply of electric power to a load, characterised in this that first means are provided in the automatic change-over equipment for delaying the completion of an impending change-over from standby supply equipment to the normal supply equipment for a period of time sufficient to allow the output voltage of the normal supply equipment to be brought to a predetermined value, said delay means including regulating means associated with said normal power supply for controlling the output voltage thereof, and second control means in said automatic change-over equipment to load the voltage output of the normal supply equipment standing by to a definite low level and thereafter to raise it a predetermined fixed amount before the change-over is fully effected.

2. A system according to claim 1, further comprising a voltage transformer having an output tapping, a contactor, a delay relay and a mechanism, wherein said automatic change-over equipment is adapted on the application of power to said power supply equipment for the time being standing by, to lower said voltage output tapping thereon to a definite low position and thereupon to effect circuit changes to operate said contactor to extend said power to a further predetermined point in the said power supply equipment standing by; to energise said delay relay to withhold complete change-over; and to set in motion said mechanism to raise the output voltage of said supply equipment at said further point by said predetermined amount.

RICHARD KELLY.

REFERENCES CITED

The following references are of record in the file of this patent:

UNITED STATES PATENTS

| Number | Name | Date |
|---|---|---|
| Re. 16,917 | Williams | Nov. 29, 1927 |
| 1,478,079 | Wescoat | Dec. 18, 1923 |
| 1,770,055 | Williams | July 8, 1930 |
| 2,004,792 | McCarty | June 11, 1935 |
| 2,031,942 | Duguid et al. | Feb. 25, 1936 |
| 2,219,459 | Spencer | Oct. 29, 1940 |
| 2,329,010 | Spencer | Sept. 7, 1943 |